United States Patent [19]

Menick

[11] Patent Number: 4,482,896
[45] Date of Patent: Nov. 13, 1984

[54] DIFFERENTIAL ECD DETECTOR FOR LORAN C RECEIVER

[75] Inventor: Ralph E. Menick, Euless, Tex.

[73] Assignee: Motorola, Inc., Schaumburg, Ill.

[21] Appl. No.: 453,428

[22] Filed: Dec. 27, 1982

[51] Int. Cl.³ .............................................. G01S 1/24
[52] U.S. Cl. .................................... 343/390; 364/452
[58] Field of Search ................ 343/389, 390; 364/452

[56] References Cited

U.S. PATENT DOCUMENTS 3,868,690  2/1975  Miller .................................. 343/390
4,166,275  8/1979  Michaels et al. ..................... 343/389

*Primary Examiner*—Theodore M. Blum

*Attorney, Agent, or Firm*—F. John Motsinger; Edward M. Roney; James W. Gillman

[57] ABSTRACT

Apparatus for processing received Loran C signals and compensating for envelope cycle discrepancy (ECD). A measure of ECD is determined during the fine settle operation and compared to a reference value which is an average over a period of time. If the difference between the reference and the ECD measure is greater than a threshold, the decision made by the fine settle operation is rejected and the fine settle process is restarted. If the difference is less than the predetermined threshold the decision is accepted as being an accurate fine settle determination.

10 Claims, 8 Drawing Figures

DIFFERENTIAL ECD DETECTOR FOR LORAN C RECEIVER

BACKGROUND OF THE INVENTION

1. Field of the Invention

This invention relates generally to apparatus for processing Loran C signals and more particularly to apparatus for processing a received Loran C signal and compensating for envelope cycle discrepancy.

2. Description of the Prior Art

Loran C is a radio navigation system employed in the low frequency portion of the radio spectrum at a carrier frequency of 100 kilohertz. A typical Loran C chain of transmission stations includes a master station and at least two secondary stations each of which transmits a plurality of radio frequency pulses at pre-selected times relative to each other. The Loran C receiver operates by measuring the difference in time of arrival of the RF pulses transmitted by the transmitting stations. These time differences (TD) are the time measured between the arrival of the pulses from the master transmitter in each of the other secondary transmitters in the group. Each measured TD is a function of the receiver's distance from the master and the secondaries. To determine the location of the Loran C receiver, the TD between time of arrival of the first secondary station pulses and the master station pulses is determined and employed to plot a hyperbolic line of position on an appropriate map. The TD between the time of arrival of a second secondary station pulses and the master station pulses is determined and used to plot a second hyperbolic position intersecting with the above first mentioned line of position thus yielding the location of the Loran C receiver.

Figure 1:
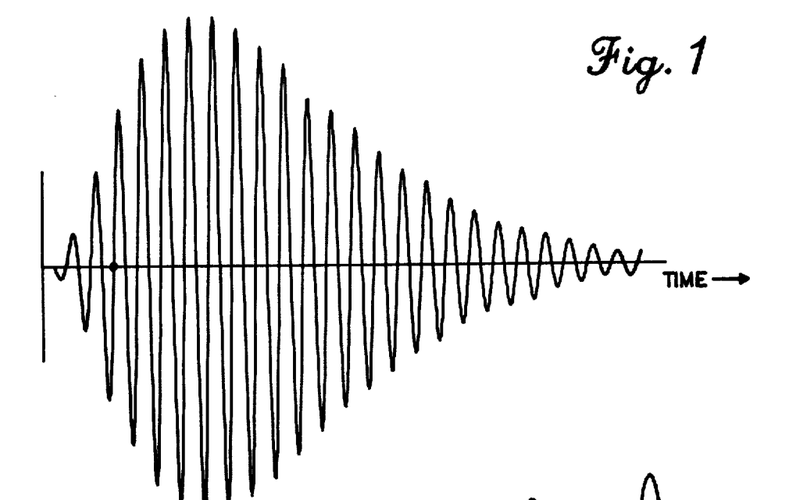
FIG. 1 is an amplitude vs. time representation of a typical Loran C pulse.

The signal transmitted from each station is a series of pulses of RF carrier at 100 kilohertz with a prescribed envelope, as shown in FIG. 1. The receiver locates and tracks pulses from each station by phase locking to one of the pulse's positive-going zero crossings, normally the third positive-going zero crossing designated as the pulse tracking reference (PTR). The TD's are typically obtained by gating on a counter at a time coincident with the arrival of the master station's tracked zero crossing and counting the number of time increments that occur until the counter is gated off at the arrival of the tracked zero crossing of the secondary. This method of measuring TD's requires that the same zero crossing is tracked on each station's pulses. If this were not true, the TD's measured would vary by increments of ten micro-seconds (one carrier cycle) each time it was necessary to acquire and track a station. The ambiguity would result in location errors of many miles, thus, the convention has been adapted to use the third positive-going zero crossing of the pulse as the PTR.

In normal operation, the Loran C receiver starts in a "search" mode, searching for and phase-locking to a zero crossing of the pulses transmitted by the master and the secondary stations. The Loran C receiver then enters the "coarse settle" mode, wherein a means is employed to jump the phase tracking point up toward the front of the pulse, such that it is known that the pulse tracking point is near the desired PTR. At this point, the receiver enters the "fine settle" mode, wherein the phase tracking point is jumped to the exact PTR. When fine settle has been completed on the master and at least two secondaries, TD measurement operations are started resulting in the output of location information. The critical operation is the "fine settle" mode. An error in tracking cycle selection in the fine settle mode can result in subsequent location errors of one or more miles.

Figures 2A, 2B:
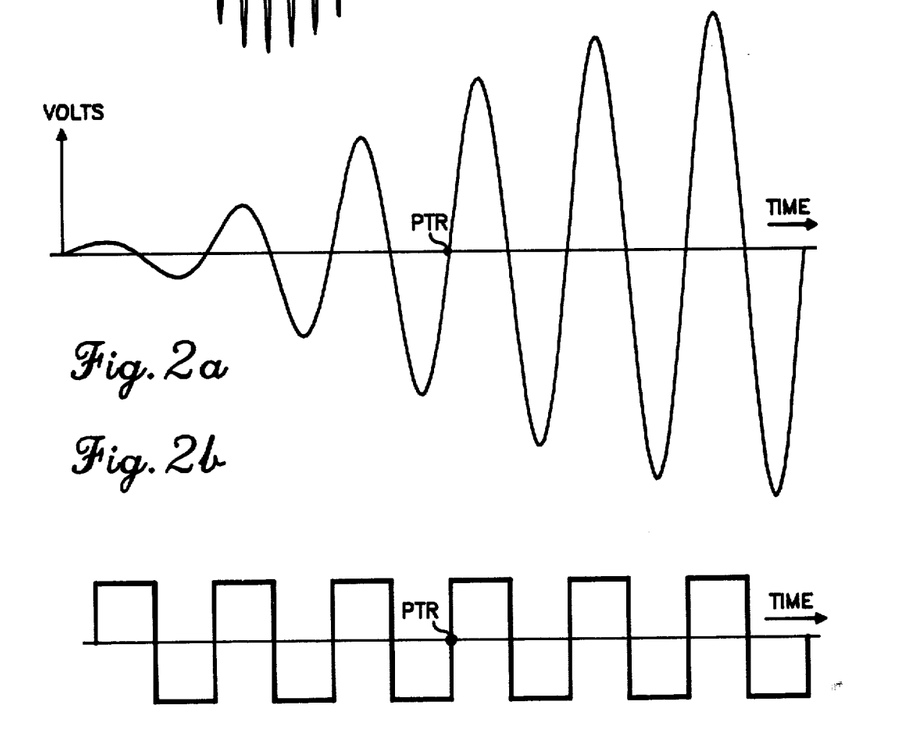
FIG. 2a is an amplitude vs. time representation of the first few cycles of a typical Loran C pulse.
FIG. 2b is an amplitude vs. time representation of a hard limited Loran C pulse.
Figures 3A, 3B:
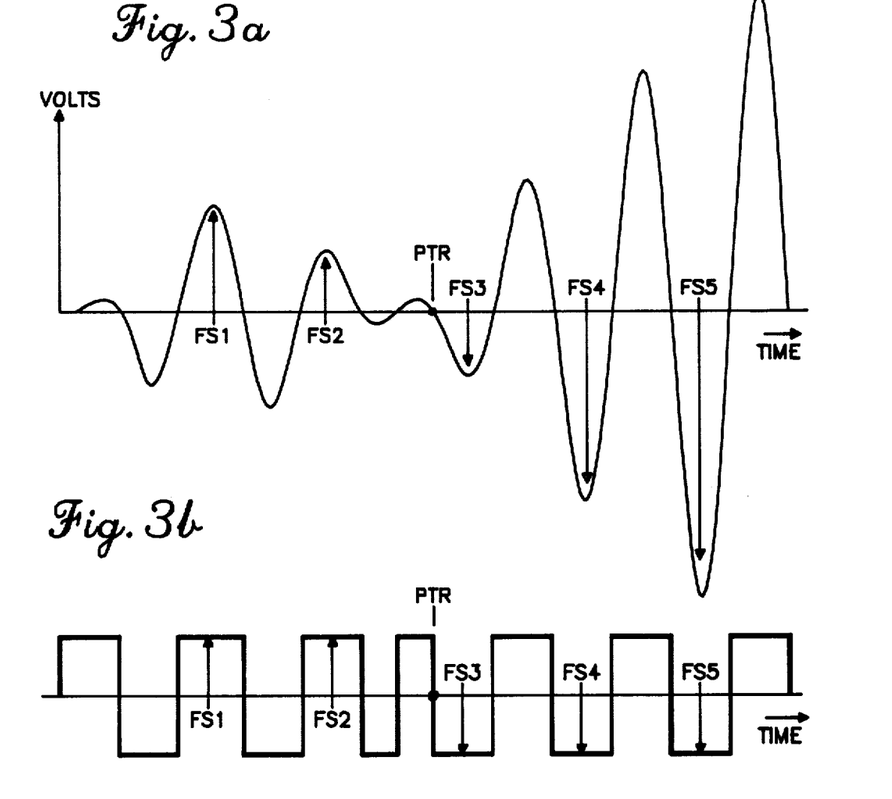
FIG. 3a is an amplitude vs. time representation of the phase reversal portion of an envelope derived Loran C pulse.
FIG. 3b is an amplitude vs. time representation of a hard limited envelope derived Loran C pulse.

Most Loran C receivers operate using pulses which have been hard limited to simplify the RF design and facilitate the interfacing of signal path through pulse sampling circuitry to digital circuitry. However, since the pulse envelope contains the information necessary to make a fine settle decision in the carrier cycle peak ratios, this information is lost in the hard limiting process. The first few cycles of a received Loran C pulse are shown in FIG. 2A, and the hard limited wave form as seen at the pulse sampling circuitry is shown in FIG. 2B. The limited waveform is binary in form and contains sufficient information for the receiver to carry out the search, coarse settle, and TD tracking functions. During the fine settle process, "envelope deriver" circuitry is switched into the RF signal path before the hard limiter for some of the received pulses. This circuitry adds a five microsecond delay and amplified version of the received pulse to the original pulse, resulting in a new pulse, (as shown in FIG. 3A) which contains a phase reversal at the PTR. This new waveform is hard limited producing a waveform such as that shown in FIG. 3B. The PTR can thus be determined by sampling the hard limited envelope derived pulses at 7.5 microseconds ahead and 2.5 microseconds behind the positive zero crossing times of the normal pulse near the one being tracked as a result of the coarse settle operation. When a change in state of the binary wave form is found along with a set of these leading (L) and trailing (T) samples, the PTR is the zero crossing point that lies between them.

In actual operation in a noise filled environment, statistical averaging of samples from many pulses is used for the fine settle operation. For example, five sampling strobes (see FS1 to FS5 in FIG. 3B) may be used on each pulse. They take samples of the derived pulse 17.5 and 7.5 microseconds ahead of and 2.5, 12.5, and 22.5 microseconds after the phase tracked zero crossing which was reached at the end of the coarse settle mode. The samples from each pulse are processed to increment or decrement the designated accumulator in a group of five corresponding to the samples FS1 through FS5. After samples from many pulses have been accumulated, a fine settle operation is started to examine each adjacent pair of sample accumulators as a potential leading or trailing phase reversal pair, starting with FS1 and FS2. When an adjacent pair of accumulators is found such that the leading 1 (designated L) is positive and greater than some predetermined positive fine settle threshold, and the trailing one (designated T) is negative and less than some predetermined negative fine settle threshold, the PTR is considered found and the phase tracking point is locked to the positive zero crossing that lies between the leading and trailing sample point. Once this has occurred, the envelope deriver circuitry is switched out of the RF signal path and the receiver now tracks the PTR of the hard limited pulse. If no adjacent pair of accumulators pass the fine settle threshold test, another set of fine settle samples is added to the existing accumulations and the detection operation is run again. The process is repeated until the PTR is found.

The fine settle thresholds are chosen to keep the probability of making an incorrect decision on the PTR to an acceptable level while maximizing the probability of making a correct decision in as short a time period as possible. A major factor which affects the PTR determination is a type of pulse distortion called Envelope Cycle Discrepancy (ECD). ECD is a differential phase delay to group delay distortion which manifests itself as a difference in arrival time between the RF pulse carrier and its envelope. Thus, although the pulse generated at a transmitter is the pulse shown in FIG. 1, the received pulse may have its carrier phase-shifted under the envelope. This alters the leading/trailing cycle peak ratio on either side of the PTR, distorting the information required for fine settle. The effect this has on a hard limited receiver is to decrease the signal level at the leading sample point for a negative ECD and to decrease the signal level at the trailing point for a positive ECD. Thus, a non-zero ECD degrades the fine settle performance by increasing both the PTR selection time and the percentage error.

It is well known that the average value of ECD of the pulses received from a particular transmitter is a function of the distance from that transmitter. It varies from a maximum of approximately a positive 2.8 microseconds within a hundred miles of a transmitter to about a negative 0.5 microseconds at a distance of 800 miles. In prior art systems using average values or emperically derived values, a fine settle threshold is chosen to meet the required error criteria (typical 1 in 10,000). This procedure is used in the design of marine Loran C receivers resulting in a receiver which meets required performance for the marine environment. While this fine settle method works well for a Loran C receiver operated in the marine environment, it does not perform well when a receiver is operated in the land mobile environment. This is due to the fact that in a marine environment, signal level and ECD variations are dominated by a dependence on distance from the receiver to transmitter. Over land, this is true only in an average sense. The proximity of the receiver to bridges, tunnels, buildings, and power lines, etc. can significantly affect received signal distortion. The total ECD observed at the receiver therefore contains a randomly varying component in addition to the distance dependent non-dynamic component. Thus, prior art systems, although adequate for marine environments, are unacceptable in a Loran C receiver which is to be used in a land mobile vehicle location system.

SUMMARY OF THE INVENTION

Accordingly, it is an object of the invention to provide a novel means of compensating for the effect of ECD cycle selection error.

It is another object of the invention to provide a novel Loran C receiver suitable for use in a land mobile environment.

It is yet another object of the invention to provide fine settle apparatus for a Loran C receiver which compares the average ECD for a station to a short term ECD to maximize accuracy and speed in the cycle selection operation.

Briefly, according to the invention, Loran C signal processing apparatus is provided for compensating for enveloping cycle discrepancy in a Loran C receiver including an accumulator for each of a plurality of predetermined sample points wherein a sample is taken and accumulated on envelope derived Loran C pulses at each of the sample points. In addition, the accumulators are scanned to make a fine settle determination to identify a leading accumulator (L) and a trailing accumulator (T). The improvement of the invention comprises circuitry for calculating a measure (M) of envelope cycle discrepancy determined by $M = (L+T)/(L-T)$ in response to a fine settle determination, and circuitry for generating an ECD reference, E. In addition, circuitry is provided to compare the reference E to the M calculated for the most recent fine settle determination to produce a control signal if the difference is greater than a predetermined threshold, and circuitry to reject the fine settle determination and initiate a new fine settle determination in response to the control signal.

BRIEF DESCRIPTION OF THE DRAWINGS

The features of the present invention which are believed to be novel are set forth with particularity in the appended claims. The invention itself, together with further objects, features and advantages thereof, may best be understood by reference to the following description when taken in conjunction with the accompanying drawings.

DETAILED DESCRIPTION OF THE PREFERRED EMBODIMENT

Figure 4:
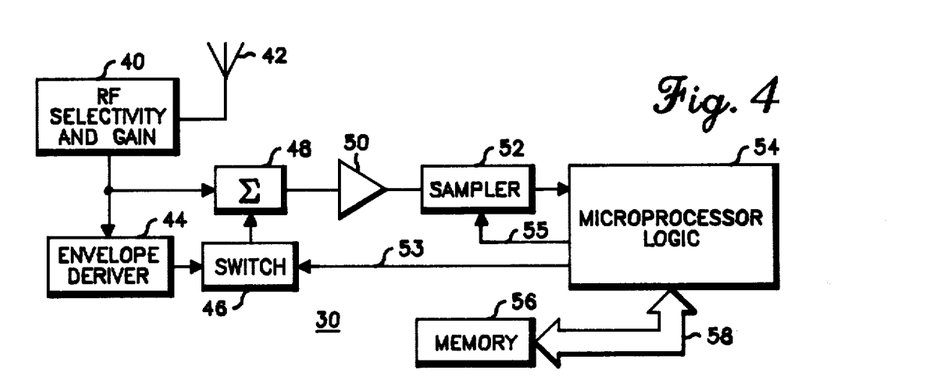
FIG. 4 is a block diagram of Loran C receiver apparatus according to the invention.

FIG. 4 shows Loran C signal processing apparatus 30 in accordance with the present invention. The processing apparatus 30 includes RF selectivity in gain stage 40 coupled to an antenna 42 for receiving and amplifying Loran C signals. The received signals a are coupled, as shown, to a summing circuit 48 and an envelope deriver circuit 44 which generates envelope derived Loran C signals. Envelope deriver circuits are well known to those skilled in the art. As already discussed, such envelope deriver circuits as circuit 44 inject a phase reversal at the location in the RF envelope of the Loran C pulses corresponding to the pulse tracking reference (PTR) of such pulses. The envelope deriver 44 is coupled, as shown, to a switch 46 for selectively switching the envelope deriver 44 into the signal path, thereby coupling the envelope deriver 44 to the summing circuit 48. When the envelope deriver 44 is coupled to the summing circuit 48, the output thereof is a waveform such as that shown in FIG. 3a. The switch 46 is controlled by a multiplex control signal provided via the conductor 53 from the microprocessor logic 54, as shown.

The output of the summing circuit 48 is coupled, as shown, to a hard limiter 50 which hard limits the Loran C pulses, thereby generating a signal such as that shown in FIG. 2b, and hard limiting envelope derived pulses when the envelope deriver 44 is switched into the circuit, thus generating signals such as shown in FIG. 3b.

The output of the hard limiter 50 is coupled to the input of the sampling circuit 52, as shown. Sampling circuit 52 samples the hard limited Loran C pulses and hard limited envelope derived Loran C pulses at times determined by sampling strobes coupled to the sampling circuit 52 via the conductor 55 from the microprocessor logic 54, as shown. (A more detailed description is disclosed in an application filed by Robert V. Janc on Jan. 5, 1981, bearing Ser. No. 222,458 and assigned to Motorola, Inc.) The samples are coupled to microprocessor logic 54 which processes the samples to perform coarse settle and fine settle operations as previously described. A random access memory 56, is coupled, as shown, to the microprocessor logic 54 via an address/data bus 58 to provide storage for the microprocessor logic 54. The microprocessor logic 54 utilizes a microprocessor such as a Motorola MC6808.

The invention is an additional process amended to previously described fine settle operations relying on the fact that the average ECD doesn't change quickly with time for a moving vehicle. Thus, the invention involves determining a measure of ECD during the fine settle operation and comparing it to an average ECD for the Loran C station involved. If the difference is greater than a predetermined threshold, the decision made by the fine settle operation is rejected and the fine settle process is re-started. If the difference is less than the predetermined threshold, the fine settle decision is accepted as being the true PTR. The threshold can not be made arbitrarily small because many correct decisions would then be thrown out due to noise and phase tracking errors, thereby unduly increasing the average amount of time to fine settle. The preferred measure of ECD is $(L+T)/(L-T)$ which has been found to have maximum insensitivity to signal to noise ratio variations and cross rate interference. However, it should be noted that other measures of ECD may be used (e.g., $L/T$, $L+T$, etc.).

Figure 5:
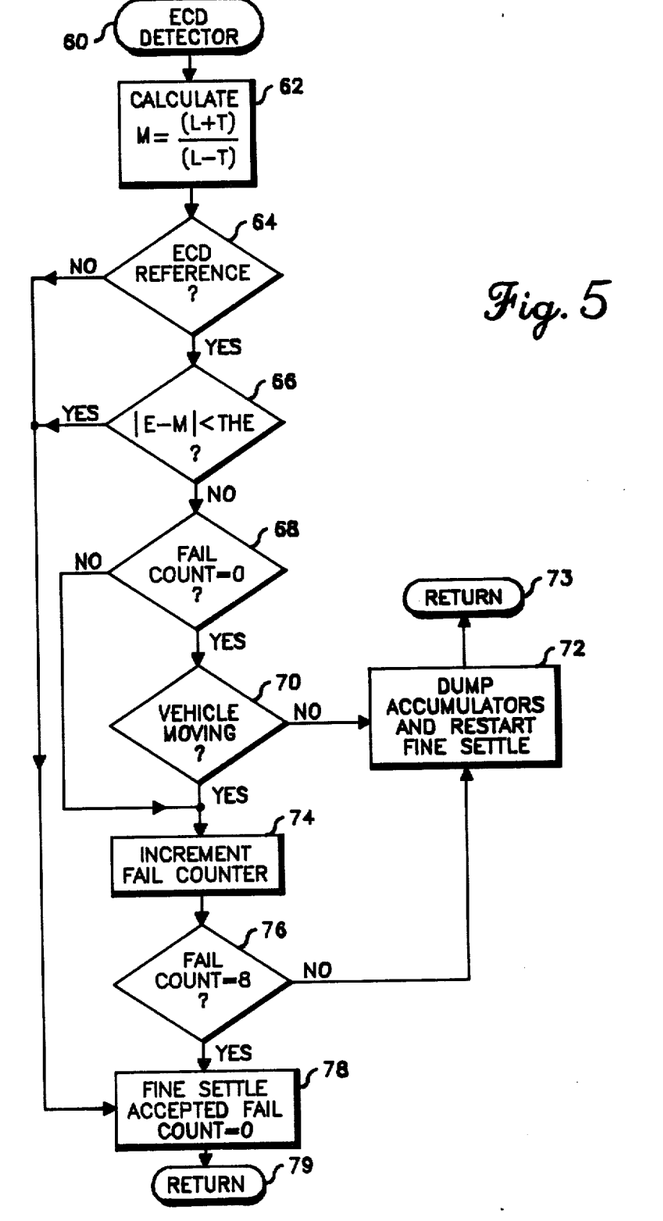
FIG. 5 is a program flow diagram for the ECD detector routine of the computer program for the invention.

Referring to FIG. 5, there is shown a flow diagram of the ECD detector routine. The ECD detector routine is entered at block 60 from the main program after a fine settle operation has been completed wherein a tentative PTR has been located such that the leading accumulator L and the trailing accumulator T has been identified as described hereinbefore. Program flow proceeds directly to block 62 where an ECD value M is calculated using the formula $(L+T)/(L-T)$. The program flow then continues to block 64 to test for the existence of an ECD reference. If none exists, indicating that this is the first fine settle operation, program flow proceeds to block 78 where the fine settle decision is accepted. The fail count is then set to zero, as shown, and program control is returned to the main program where the newly determined PTR is tracked. However, if at block 64 the result was positive, program flow continues to block 66 where the reference E (to be discussed in detail hereinafter) is compared to the ECD measure M to determine if the difference is less than the predetermined threshold (e.g., in the preferred embodiment approximately 1.5 microseconds). If the difference is less than the threshold, program flow proceeds to block 78 where the fine settle decision is accepted, and as before program control is returned to the tracking operation. If the difference at block 66 is greater than the predetermined threshold, program flow proceeds to block 68 to test if the fail count is equal to zero to determine whether this is the first failure of the reference test. If this is not the first reference test failure (i.e., if the fail count is not equal to zero) program flow proceeds directly to block 74 where the fail count is incremented. If the fail count is equal to zero, the program flow proceeds to block 70 to test whether the vehicle is moving. If the vehicle is not moving, the program flow proceeds to block 72 rejecting the fine settle decision, clearing the accumulators to restart the fine settle operation, and then returning program control to the fine settle operation as indicated at block 73. If the vehicle is moving, the program flow proceeds from block 70 to block 74, as shown, where the fail count is incremented and then to block 76. At block 76 a test is performed to determine if the fail count equals 8, and if so, program flow proceeds to block 78, where the fine settle decision is accepted, the fail count is set to zero, and the program control is returned to the main program as indicated at block 79. If at block 76 the fail count does not equal 8, the program flow proceeds to block 72 to reject the fine settle decision and restart the fine settle operation by clearing the accumulators and returning the program control to the main program as indicated at block 73. In this way, the fine settle decision can be accepted without passing the reference test if there have been eight consecutive reference test failures, after a reference test failure occurs when the vehicle is moving.

Figure 6:
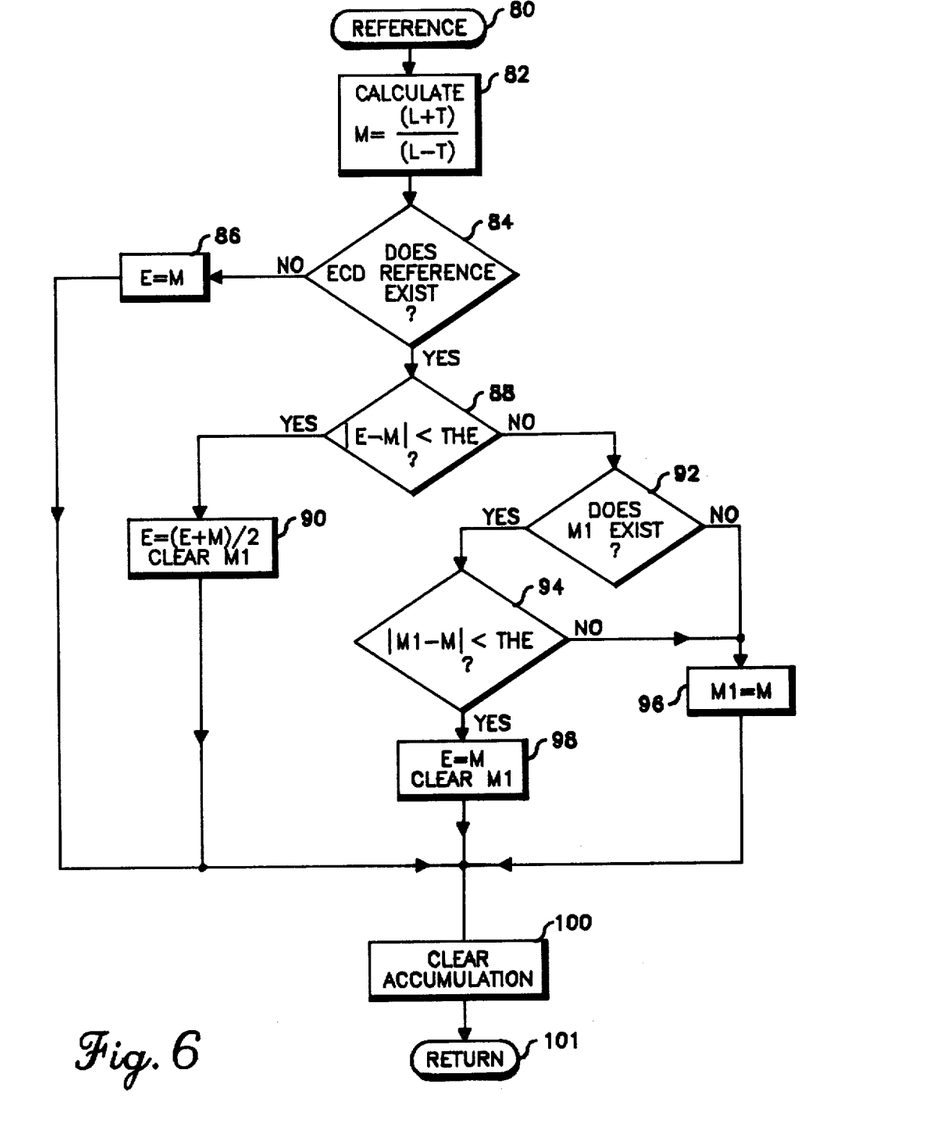
FIG. 6 is a program flow diagram for the reference routine of the computer program for the invention.

FIG. 6 is a program flow diagram of the reference routine of the computer program for the invention. The reference routine is entered, as shown, at block 80 from the main program after having completed a successful fine settle operation and after a predetermined number of Loran C pulses has been tracked. The L and T accumulations for this routine are accumulated in the tracking mode and thus cannot exist before the first successful fine settle decision. During tracking, the first seven of the eight Loran C pulses in a group are sampled normally in a PLL tracking loop. However, the eighth pulse is envelope derived and sampled as a pulse would be during fine settle selection. In the preferred embodiment, when 6300 of these samples have been accumulated to form an L accumulation and a T accumulation, then the reference routine is entered. These L and T accumulations, made over an extended period of time are used in the reference routine to establish the ECD reference, E. The program flow starting from block 80 proceeds directly to block 82 to calculate the ECD measure M utilizing the formula $(L+T)/(L-T)$. Program flow proceeds from block 82 to block 84 to test if an ECD reference has previously been determined. If no reference existed, the reference E is set equal to the ECD measure M as shown at block 86, and then program flow proceeds to block 100, as shown. If the ECD reference did exist at block 84, program flow proceeds to test block 88 to determine if the old reference E is within a predetermined threshold of the new measure M. (The threshold in the preferred embodiment is approximately 1.5 microseconds). If the difference at block 88 is less than the threshold, the program flow proceeds to block 90 to calculate a new reference E utilizing the formula $(E+M)/2$, and then to clear the temporary value M1. Program flow then proceeds to block 100, as shown. However, if the result at block 88 was negative, program flow proceeds to block 92 to test to determine if there is a value M1, and if not, M1 is set equal to M as indicated at block 96. If the result at block 92 is positive, program flow proceeds to block 94 to test to determine if the difference between M1 and M is less than the predetermined threshold, and if so, the reference E is set equal to M as indicated at block 98. If not, the program flow proceeds to block 96 where M1 is set equal to M and then to block 100 where the accumulations of L and T are cleared to start a new accumulation. Program flow is then returned to the main program to continue tracking the PTR and accumulate a new set of L and T accumulations.

In summary, a novel differential ECD detector for a Loran C receiver has been described which is well adapted for a land mobile automatic vehicle location system. The invention minimizes false fine settle tracking decisions, decreasing PTR selection time and error rates.

While a preferred embodiment of the invention has been described in detail it should be apparent that many modifications and variations thereto are possible, all of which fall within the true spirit and scope of the invention.

APPENDIX I

The following is an Hex memory dump of the computer program for the invention utilizing a MC6808 microcomputer.

```
S00E00004C4333202020202E4C58E0
S11E0800243334F4625343E1447263535C1E0427363D1C0E0237DE1DE0
[Hex memory dump continues — illegible due to image quality]
```

S11BDC80C6104FBDDFE4CE0076DF663766F6976ED66BD06DD76F2604AE
S11BDC98666FF976ED66AD26C010F07946ED76E060E39966B96D976FAE
S11BDCB0966A996C976E397F00767F004F7F007ACE0070DF6EC66D767
S11BDCC8674AC01442748D6500474C40F2605740074 20EED60104774269
S11BDCE014D6500474C4F0261A663CBDDFEBDF6E74007420D4D6500446
S11BDCF874C4F027ECA60EB5042703BDDD2EDF66BDDD63BDDD4C86066C
S11BDD10977ADE6E20D3BDDD85964F6A07677000BDE00C96766A0FE7E4
S11BDD2867000BDE00C39CE0144EE33A6002B078C01442702 20F37D00F7
S11BDD407A2604662020028610974F3937DE6B6603E637C4F0DA7AF762
S11BDD587000BDE00C7C007AE63958585856DA7AF77000BDE00C7C0041
S11BDD707A084A26DCDE68E610C4F0DA7AF77000BDE00C3339A601481A
S11BDD884848489A78977839CE00704FC604BDDFE4CE0144EE33DF68FB
S11BDDA08638BDDFEBDF6CDF6ECE0073DF6A4FC604BDDF65DE688635E5
S11BDDB8BDDFEBDF6ACE0070DF6CC604BDDF94DE688C014426CE39CEEA
S11BDDD000704FC604BDDFE4DE12DF6ACE0070DF6CC602BDDF94CE00A6
S11BDDE870DF6A8601BDDFA6CE01448635BDDFEBDF6A8601BDDFA6CE66
S11BDE000073DF6ACE01448638BDDFEBDF6CDF6E8601C604BDDF65CE3A
S11BDE1801448635BDDFEBDF6ACE0074DF6CC604BDDF947D00742A1C60
S11BDE304FC604CE0070BDDFE4CE0077DF6CDF6ECE0073DF6A8601C64B
S11BDE4804BDDF65CE0075DF6ACE01448639BDDFEBDF6CC603BDDF9490
S11BDE6039CE0144EE336C014426037EDF53DF688635BDDFEBDF6ACEEF
S11BDE780070DF6CC604BDDF944FC602CE0074BDDFE47F0079DE12DF39
S11BDE906ACE0074DF6CC602BDDF94CE0074DF6A8601BDDFA6CE0071F4
S11BDEA8DF6ADF6ECE0075DF6C8601C602BDDF657D00702B037C0079DA
S11BDEC07D00702AC8967081952D037C0079CE00704FC604BDDFE47DD2
S11BDED80079271CCE0073DF6ADF6ECE01448638BDDFEBDF6C4FC604DF
S11BDEF0BDDF657A007920DFDE688638BDDFEBDF6ADF6ECE0073DF6C76
S11BDF084FC604BDDF65DE688635BDDFEBDF6A8601BDDFA6DE68863548
S11BDF20BDDFEBDF6A8601BDDFA6DE688636BDDFEBDF6ADE688639BDB6
S11BDF38DFEBDF6CC604BDDF94DE688635BDDFEB4FC604BDDFE4DE6858
S11BDF507EDE648635BDDFEB4FC604BDDFE4960C847F970C394D271114
S11BDF6837DE6C8699A000A700095A26F6330D20010CDE6AA60009DFF4
S11BDF806ADE6CA9001909DF6CDE6EA70009DF6E5A24E739DE6AA600E4
S11BDF9808DF6ADE6CA70008DF6C5A26EF394D26118604C6040CDE6A04
S11BDFB06900095A26FA4A26F239DE6A0808086605AB0019A700C603AF
S11BDFC8096600A90019A7005A26F58604C6040CDE6A6600085A26FA40
S11BDFE04A26F239A700085A26FA39DF1096119711840099109710DE33
S11BDFF81039B6D0B770006D0B4C81DF26F6662FB77000393666FF4ACD
S11BE0100126FC323986CA971A869F971B861C971CDE12EE00BDE7276E
S11BE028BDD9FF86E6BDDA03860FBDDA0B7F000B960A8420970A3996CC
S11BE0401A9718961B97197F001D961CBDDA07CE003CDF22CE0180DF75
S11BE05824BDE7747F001ECEE259DF14BDE9013986CA971A869F971B1F
S11BE070961C84F88B04971C7F000B39960B46250A961A9718961B97A4
S11BE08819200896 1B9718961A97197F001D961CBDDA07CE003CDF2264
S11BE0A0CE0180DF24BDE774CE00DEDF247F001E960A84E04C970ACEEF
S11BE0B8E39FDF14BDE90139CE0040DF22FF0053CE0050DF24BDE7745D
S11BE0D07F001D7F0052960B462504961A2002961B9718960A84F08AE7
S11BE0E802970ACEE49CDF14BDE9013986F9971A86AC971B961C8A0701
S11BE100BDDA0784FC971CCE0999BDD9FFCE1000DF3CCE0144DF3F4FB4
S11BE118BDE199CED8C2FF014CCE0144963FA7339640A734DE41DF3C53
S11BE13086E6973E7F000BCE0000DF43DF45DF47DF49CE0144DF41C6AD
S11BE148CA960A2B02C69FD719BDDC6C8608BDDA0B960A84E08A039772
S11BE1600ADE41A60E8A80A70E39D61A960A2B02D61BD7167F001DCEC7
S11BE1780090DF22CE0144DF24BDE774963C8B981997 1ECEE91ADF1445
S11BE190CEE556DF16BDE90139DE3FC63C6F00085A26FADE3FA7008639
S11BE1A802A701CE0001BDE8840E3F963CA70A963DA70E86E6A70C66EF
S11BE1C00AA70DB60149A705B6014AA706B6014BA707CED6C8DF3CDE14
S11BE1D83F963CA70896 3DA70939960A84A08A04970ACE0144A60E8A6B
S11BE1F0E0A70EA60084F8A7006F296F2AEE338C014426E97F000BCE2E

```
611BE208E91ADF149600E70136E70155960127006E6700A196026700E6
611BE220DE6700DD9603E7011A6701199606A7F970C7F005506173764
611BE238DC39DE41A60E8A60A70EA610A4F6A7106F296F2AA6018A6018
611BE250A701961C6A10971C39960D2704816223013681012766D01E7F
611BE2682607CE005CDF22971E960ED6186504270155D72106186806020
611BE28027015507200619650427015507216018560270153176066063
611BE298DE229C24272576002024026C0076002124026C01962402603H
611BE26002760017240260506080809024270557260E0E22060606A7
611BE2C808DF223B961D81042607CEE2FADF14201D4C971D85012606 05
611BE2E0961AD61B20049961BD61A9718D7197F001ECEE259DF14BDE9DE
611BE2F8013BCE0038DF22CE0180DF2496188B9319971E8614971F7A16
611BE30972086409721BDE79B252E6DE781250BDE03F3B7C000B964B
611BE3280E81032607BDE066BDE07C3BBDE710CEE340DF14BDE9013B4H
611BE340DE18BDD9FFBDE03F3B660C580270147F9A0A970A961E8B9841
611BE3581997189618C84074848484848491DE12EE00DF3CDE18DE8FB
611BE37084DE3CBDE729BDD9FFBDE901DE12EE00DF4196428B991997 40
611BE3884296418989919974DE41BDD9FFBDE901BDE0F4BDE16A38969 8
611BE3A00D27048182230138B101272806E01E2607CE003CDF22971E4FC6
611BE3E8BDE8054FD61DC10C2C028A01C1052F026A02BDE73CDE2208 6C
611BE3D008DF223B961D81112609CEE40CDF14BDE9013B4C971D850160
611BE3E82707960E462507200B960B462506D61AD7182004D61BD716E6
611BE4007F001ECEE39FDF14BDE9013BBDE901CE0000DF26DF28DF2A84
611BE418CE004ADF22CE00DEDF24961E8B9319971E36C630071FC61A7E
611BE430D720C680D721BDE79B2408BDE7C6BDE7AA20F632971ECE00AD
611BE446ECDF22CE0180DF24BDE79B2408BDE7C6BDE7AA20F686FFBDFE
611BE460E7C64D2704BDE0C03BBDE781250BDE07C3B7C000B960B46D3
611BE47B2404BDE07C3BBDE710CEE48ADF14BDE9013BDE18BDD9FF962 6
611BE4900B810626037ED949BDE07C3B960D2B013B8101276CE0026B7
611BE4A88699A0008B01199B0D198107230138 7F00507F0051960E2ADF
611BE4C0037300508504270373005178001825067300507300 51FE00C3
611BE4D853961D810B2E0EB60050 27026 C00B600512 7026C01961D81EE
611BE4F0062D0EB6005027026C08B600512 7026C09730052 26067C001A
611BE508547C0054 3B961D81112609CEE54ZDF14BDE9013B4C971D461H
611BE52024079608462407200B9608462406961B9716 2004961A771885
611BE5387F0052CE0040FF005338BDE901CE0040BDE632CE0048BDE814
611BE550324FBDE7C67EE450960D81012721F601522A0138911E230116
611BE5683B4FD60B562401HCBDE805860 1BDE73CDE2206080 8DF22 3B8 632
611BE58001522B26961D8106 2607CEE5B60DF1620147C001DD61A960AB4
611BE59885802602D61BD718CEE558DF16CE0090DF22CEE91ADF14BD7H
611BE5B0E901B6600F3BCEE91ADF14CE009EDF22CE0144DF24961E8B7F
611BE5C89319971EC630071FC61AD720C680D721BDE79B2408BDE8A223
611BE5E0BDE7AA20F6BDE78124497C000B4FBDE8A29751CED861F66077
611BE5F800C40F085A2AFCE600D750D451D850C40F272C960B61042DD9
611BE6102206505454 54D752D451D85227189 60B8106 2D0ED6 50D442
611BE62851BDE9118102 2C077ED949BDE16A3BCEEA40DF16BDE9013B6A
611BE640CE0090DF3FD650CE0043C5082707600 2608BDE877080806F1
611BE6582 0F0DF22DE12EE00DF3C963C8B9219973CDE22EE00EDE8B4AA
611BE6706680C580270147D707BDE199CE0140DF14BDE8F6DE3FDF1406
611BE668DE22EE00DF3CEDE877DE3F8C0144274D607 58DE2208086C27
611BE6A0004B2738C5082712 6D0026 18DF 22BDE877DE3F8C01442724AD
611BE6B8DE22508088C004B271A20E0DF2D707EE0BDE8848B0C50 5
611BE6D08027014FBDE199BDE8F620A6963C8B0819973CCE0001BDE8D8
611BE6E884DE3CFF014ECEE60AFF0130CE0144DF3FBDE6F6BDE1E2CE02
611BE700E91ADF14BDE901CE0144EE33EDF8E73BDE12EE00BDE72 7DFFE
611BE7181896 18 16 8E 74199718DE16BDD9FFD71839DF189619889919AC
611BE7309719961889919971 8DE1839C608DE22 9C24272F7002 02 486
611BE7480885012706C0020068502 27026CA2760021240885012 70A2C
611BE76060C01200685022 7026CA30608 9C24 27035A26D139DE226F0 56
611BE7760F010808 9C2426F6399618707 4A61FF2605860BD020010CFA
```

```
611BE790D61CC4F8D71C9A1C971C39C680DE22A600901F2C01A0912071
611BE7A82C18089C242711DE21C1802EA86799B1E1797 1E8101262F97
611BE7C00C39761E0D3981FF26039626394D2610DE27DF26DE29DF26C5
611BE7D8DE2A0F297F002B39DF1437CE002C600A1002715065A26F8EB
611BE7F0CE002C606BD02604A7002040B5A26F4DE143339702615B9
611BE8096D0E061B8304270153D721D6186580270153D72039760ED64E
611BE82018B5202701530721D618654027015307203960660A80225
611BE83B8018C01406F0081DE2C026C00085A26EB09090909090909C668
611BE85002600026086D022604D042705065A26F039C680960A85407D
611BE86827015F86FFED67C6971E32327EE3499640B3C9740963F8769
611BE88000973F39DF4BB69990AC974C86999704B9748763D0D994C19A6
611BE8B9897309630994B19973C39702611CE0043C604D0027010D476B
611BE8B00B085A26F539DF3F37DE12060B5FA10024080B5CC10526F6C7
611BE8C820285D2725CE004108085A26FB6D002704A10023150700F6FB
611BE8E01C84074848484848D60AC540270280A70A701DE3F3339DE144B
611BE8F8963FA7339640A73439BDD9FB26FBBDD9FB26F6BDD9FB27FB59
611BE910394F5424014C5D26F939BDEB60DE4196D0810926050DF8C6EF
611BE9820348108260580F8F0202B810326058DF91720228102261E56
611BE940BDF931B6000AB40F81042612DE41A60E260CA601850C26065E
611BE9580D79000E200BDE41A60E85042603BDEB8FBDEE17960D810240
611BE97027013B7EE976DE416C2A26026C29E60E2A037EEF49960AB40E
611BE98B0F81042C037EF3D8C50727037EF01AA601850C27037EF01A0B
611BE9A0C54027037EF405C52027037EF57C7EF01ADE41A60E850427B2
611BE9B8057F004B2003BDEC93960A840F81032624BDECF5960797520
611BE9D0DE08DF53BDF880FE0016DF14CE004BDF94BDF8B78617BDB2
611BE9E8DA077EEA58BDECF59607A70A9608A70B9609A70C964DA70D40
611BEA00BDED94BDF89C70004BEE33A60E85042708EE33BDF894BDF804
611BEA18B7BDECF59607A70A9608A70B9609A70C964DA70DDE41EE33C6
611BEA30A60E85042608EE33BDF894BDF8B7DE418C01442705BDEA5C6A
611BEA482003BDEB25CEE91ADF14DE41EE33DF41B6600C3B5FBDEB46F4
611BEA60DE415D2607A61084DFA71039A6059707EE06DF08C10226129F
611BEA7878000979000879000778000979000879000775FCE01A4BDEB64
611BEA9046CE01445D27CEA605974BEE06DF4CC10226127800407900DA
611BEAA64C7700A4B78004D79004C79004B5F96099049749608924CC6
611BEAC0973F9607924B974E2A165C7300A4E7300 3F7000A0260B7C009C
611BEAD83F26037C004E964E2708B6705D2734402031074EB6707F0007
611BEAF04DC603D74CD640D04DD63FD24C2416801027127400AC760032
611BEB084DD64DC10C26E6C60B074D20E07D004B27014DDE41E610CA04AD
611BEB200F1BA71039D60AC4DFCE0144EE33BC01442710A6002BF5A694
611BEB3810814025EF81CF22EBCA20D70A39A60E85042613EE088CD6AB
611BEB50C8270C8CD8DA27075C8CD8D4260150C39960E849FD60FC52061
611BEB6827028A40C58027028A20970E780019250673000E73000F968C
611BEB800AB40F81042607960E2A0373000F39DE41A60E2B19D60AC4E3
611BEB980FC104261184F7B12026096D0810927050D79000E39960D40
611BEB80442523498102270B7D000E2B046C2F2002A2FE600C52027BD
611BEBC809C51026050D79000E39BDEBF93949B1052708D0000E2B04C6
611BEBE06C2E20026A2EE600C5202709C51027050D79000E39BDEBF95B
611BEBF8397F004B7F00527F0053EE08A604975AEE02DF4CDE410D7910
611BEC10000E242660322602A316A327000547300053730052730046B5
611BEC28730040C70004D26107C004C26087C004B20066C3226026C310D5
611BEC40A60E85402628967B8510272266010C5402610780040790040CAA
611BEC58790040B700540060FD47F27058540260639804027013960740AF
611BEC7009B5AA707A60699953A706A60579952A705A604984DA70A637E
611BEC88994CA703A602994BA70239DE41EE08EE00DF4CDE417F004B5C
611BECA060D022A192A3C7A004B60049B4DA704A60399A4CA703A60289D5
611BECB800A70220E7A60A7090508A7039609A70420DE60A4B07A70A76
611BECD0117C004B9607A70296DA7023DF3F7F004EA60A9707A60BEC
611BECE8A603A906A703A602A70A05A7023DF3F7F004EA60A9707A60BEC
611BED0097 08A60C84C09709CED00 DF4CDE3FE60DD7400DE4CA60087
```

```
S11BED16C0DE4B2B06C1232E09200EC2247H004E2007C0247C004E20D3
S11BED30EC074DDE4CE600C43FDA09D709E600C4C010250B47474747IE
S11BED484747200C474747474747B1FE2602660278E162B1927329oEH
S11BED6009664097099608890019770676076901977075A20E72719Cb
S11BED78760780409709240E9608E9919970876076991997070C20E2
S11BED90E9DE3F9960C2B7E965527 7HDE4C96078AC02E1927 0D8630FE
S11BEDA8AB48191686O2A92419201DE648A62420I746280926488600IE
S11BEDC0AB241920OE8650AB481916860749241997240725DE07DF221C
S11BEDD84FC6047400227600234o5A26F69B2419972496238900199796
S11BEDF0239622890019972DE419625AB3619A7389624A9719A73788
S11BEE089623A9361947369622A93519A73539DE4196OED6OAC4OFC163
S11BEE2004267DE60E2B5AC5072636C540271OC619BDEF3A84F88A0463
S11BEE3848BDEECB7EEECAC520271660DC109260378EECAC61DBDEFOD
S11BEE503A484848BDEECB2071D60DC102262ZE60EC5102665OC1E269B
S11BEE68026C1DEE1DBC189C26O6DE41CA10E7OEDE41C613BDEF3AZOA0
S11BEE80D0E60EC504270FC619BDEF3A84FC8A0248BDEECB2034D60DED
S11BEE98C1032D23C1072E1FC6218508270B6C2DBDEF3AOD2004BDEF36
S11BEEB03A0C86B0BDEECBD60AC4OFC10426oBDE41E60EC5402603BDDO
S11BEEC8EEE839260139240E6C0126026C000808482OF0E60126026AAE
S11BEEE0006A0108084620E3DE41A60185402649DE66274509DF669oC2
S11BEEF80F4424050E56080F564424050E5680DF564424050E5A08DFA3
S11BEF105A4424050E5C080F5C4424050E5E08DF9E4424050E6008DF21
S11BEF2860442405DE62080F624424050E6408DF6439DF3FDB40D740F4
S11BEF40C600D93FD73FDE3F39A62AE601C510261E81462C037EF0112o
S11BEF58CA10E7016F2D6F2E6F2FC6138DEF3AC60CBDF8557EF011D614
S11BEF700AC4OFC1042C3C81402703TEF011Ao2161002D08ZE1AA6228+
S11BEF88816A2414A62E4CA72B610326037ED947E601C4EFE70120BCB2
S11BEFA0CED8C8BDF283BDF257A60E847FA70E6F2C20E5BDF3112703B8
S11BEFB8BDF290BDF205A62A8140264DBDF22BDF36986O1E60EC540DC
S11BEFD0270148A50F2715CED8CEBDF283BDF257A60E8478640IA70E29
S11BEFE86F2C20ACI601C50C2708E60OC52027DF20E6E60EC5402607C0
S11BF000BDF257CED8DABDF283A60E6478A70E20677EE9B1BDF311273O
S11BF0184EBDF290BDF205A62A814027OBE60EC510273CBDF6A32037FF
S11BF030BDF222BDF338BDF369A60E85042703TEF18D8502260A850152
S11BF04826037EF06A7EF07F850126037EFOE07EF1319F3F8E0000AF06
S11BF06029AF27AF219E3F7EE9B1A60F850126O8A601850C2602200E3
S11BF0786C0E6F2C7EF05ABDF24B27066C0E6C012053C601A60E8540DE
S11BF090270158E50F26466F2CA60185OC263EA60E4AA70E8540272180
S11BF0A8A60084F8A700C619BDEF3AC6OCBDF855CED8C8BDF283BDF293
S11BF0C06DA601847FA70120148520271OC61DBDEF3AC605BDF855CEF9
S11BF0D8D8DABDF2837EF05AA60F8502260oA016A0E2042BDF24B27A2
S11BF0F03D6C2CA62C81O8261ZE60ECA20E70EE601CA02E701E610C474
S11BF108F0E710811F251FA60EB5402705AC70E201488628A730BDF50F
S11BF12025A601847FA701A60E4C8A40A70E7EF05AA6OF8502260464A45
S11BF1380E204FBDF24B274A6C2CA62C8149254280144260370ED947A0
S11BF150DE414F5FEE339C412705CAA0E20F5C10327037ED947E60011
S11BF1682A07850427OA7ED947850727037ED9476CoEA61084FOA71053
S11BF160C613BDEF3AC60ABDF8557EF05A8647974C7F0048A61CE61BD3
S11BF198BDF5192B0CA61E2B04B60420468806204AA61EA61DBDF51935
S11BF1B02B0CA61D2B04B6080Z0338O0A20ZFA61AE619BDF5192B13A6EC
S11BF1C8192E0EB606A730BDF5258O1E20178o2A2013A024E623BDF93F
S11BF1E0192B15A6232B04861420028O2CA730BDF52586474A2C6A0E8E
S11BF1F8C613BDEF3AC60ABDF8557EF05AE601A600B5202O0C967E85A0
S11BF21080270AA60185402604CA082002C4F7E70139C6OFA6212B16E9
S11BF22827035F201oA6228I1I2510546126250B34813A2506348199A9
S11BF240250154A60F84F01BA70L"-7A601C604850827O158E50F39E67-1
S11BF2580758E707E704E606597E7OoE7-5E6055927E705E7023FE6O357E2
S11BF270E705E702E606O6E706E703E607507E707E70439DF3FDE419oOC
S11BF2883FA7086764OA70939907E606O260C6F2E6F2FA606B52O27oAOE
```

```
S11BF2A0205CA62E2A0140bF2EC6FF6116207020C60146Z2FZA01406F2FCA
611BF2E68116200350C86202003JA6630502626E600C5202614AA006460
S11BF2D0F8A7006D98E60E2E026D72CED80460A337C430112600E6001D
S11BF2E6C4F8E7003?E600C5202717E600CE700C407C1022612BDF267
S11BF30057BDF257CED6CEBDF283A60084C8A70039A62A2721850072652
611BF31810E62DC12725U6E6U1CA4U2004E601C4BFE7016F2DA62A853E
611BF3301F260386FF394F396D212A286D312A08633160322602bC319B
611BF3486D31260bA6328182251 2A60E8A20A70EA6018A02A701A61029
611BF36084F0A7106F326F3139DE418C01442767A622AB28A722A62143
611BF378A927A721A60185042637B508261CA60E850726166B286927E9
611BF390682869276B286927A622A028A621A2272A07A60184DFA7011E
611BF3A839A6018520260b8A20A701398A04A7013968286927682869b6
611BF3C027A622A02816A621A2272B0526095D2606A60184D8A7013905
611BF3D8DE41A62A811E2622A621B1002D082E10A6228117240ABDE05D
611BF3F015BDE06bBDE07C3BC621BDEF3AC60b8DF8557EE9B1DE41D6E4
611BF4087B2A037EF4DDA6008403488106260-6F1D6F1EEE29DF4DCEA1
611BF420D86CDF4B9B4C974C964B8900974BDE4BA60091 4D260EA601C4
611BF438914E2608EE08DF4BDE4120050DE417EE9B1A61CE61BBDF51762
611BF4502B0CA61B2B048608202C86b0A2028A61AE619BDF5192B0CA660
611BF468192B048604201786062013A61EE61DEDF5192B22A61D2B04EF
611BF48086022002B612A730BDF525A60084F8A700C619BDEF3AC60923
611BF498BDF8557EE9B1A6008403488106270b6C007EE9B1A622E621BB
611BF4B02B49BDF5192B44CE00B3DF4BDE41A622E6212B11BDF5192BC7
611BF4C80CA60E84BFA70EBDE23A7EE9B1A630272D8b162024CED8CE01
611BF4E0BDF283BDF2576C0E6F2C6F316F32C621BDEF3AC608BDF855DD
611BF4F87EE9B1A63027DE8B14A730BDF525E600C4F8E700C619BDEFA4
611BF5103AC60CBDF8557EE9B12A05534026015C904CD24B39DE418695
611BF52899E630C1142D014F974BCED884DF3FDB40D740D63FC900D7B5
611BF5403FDE3FEE00DF4CDE41BDF56686FF904D974D869990-4C974CDF
611BF5588699904B974BEE33BDF566DE413?4BA60C994DA7 0CA60B99-4D
611BF5704C19A70BA60A994B19A70A39A629A0DC61DBDEF3AC606BD79
611BF588F8557EF69AA62A819627037EF69AA6272B08A62881342302-45
611BF5A020176C0E6F2CC61DBDEF3AC60ABDF855CED8CEBDF2837EF64b
611BF5B89AB147240DC61DBDEF3AC607BDF8557EF69A819024069b7BAA
611BF5D0B580 26CEBDF82DE6105CE710C10126035A2006C50226022081
611BF5E804CED87CBDEF3AEE00DF4BDE41BDF7B9A63081FF261BA6103A
611BF600840F810626B7E610C4F0E710Cb13BDEF3AC60CBDF8557EF647
611BF6189AB10C270481222b1DBDF525E610C4F0E710C613BDEF3AC6A1
611BF6300BBDF85586FFA729866AA72A205CBDF73C963FE61 2C18027F2
611BF6480A1029342A014081222E2DBDF525A60E84DFA70EA61084F0F9
611BF660A710A60184FDA701A60F840FA70FCED8CEBDF283C613BDEFDE
611BF6783AC60FBDF855201AA60F85F02609D60AC52026037EF6068BD7
611BF69010A70F858026BC7EF606DE416F316F327EE9B1A60E84EFA7F1
611BF6A80EFED882DF4BDE41BDF7B9A63081FF2758BDF73C963FE61298
611BF6C0C18027321029072A014081222F28A63081142649A611818050
611BF6D82606963FA7112031903F29F62A014081222EEF963FBDF86603
611BF8F08680A711201BA63081142621963FC180270BAB122903472 0BE
611BF7080146BDF866C680E711C613BDEF3AC60bBDF855201EC613BDDC
S11BF720EF3AC60CBDF855A60E8A20A70EA61084F0A710bF30CED8DAB5
611BF738BDF28339A630810226046132012B1142604C6152008B116b1
611BF75020-4C61720 02C619BDEF3AA601AE03974CA600A90297-4B2A1A
611BF7680F73004B70004C26037C004B8680200174F9740A601A00397DE
S11BF7804EA600A20297-4D7F003FC68078004C7900-4B96-4C904E964BC4
611BF7989 24D2B0D974E964C90 4E974C963F1B973F542b6E0 963F44D6AA
S11BF7B0402A0140973FDE4157860CA73086FF973FA614E613BDF80B2D
611BF7C82E4086 02A730A616E613BDF60B2B3361 4A730A61bE617E070
S11BF7E0F80E2B26861 bA730A61AE619BDF60B2B1 98620A730A61CE6DE
611BF7F81BEDF80B2E0C8622A730963FZE046bFFA73039ZB0FBDF517C6
611BF8102E0b86FF973F4F394F973F39BDF5192A044F973F3996DF2b13
```

```
511BF828034F973F39E610C30F260CC613BDEF3AC603BDF853DE410EE
511BF840056A14AB1EA714A613A91DA713060A5A26EFDE41375F3F8EED
511BF8580000AF00080A5A26F9DE419E3F39A7125FCE01449C41270F3
511BF870EE335C20F7CE000UBDEF3AA700DE4137CE01448609A70A865C
511BF85899A70B86E6A70C860AA70D39BDD9FB810325F739D642C144F4
511BF8A02614D60C2B1096554C9755810B26077F0055CA8D070C39DF00
511BF8B83FEE0ABDD9FFDE3FA60CBDDA0339961CD60AC40FC104261A5C
511BF8D0E60EC4F7C12027098A10BDDA07BDF9863984EFBDDA07BDF9E6
511BF8E886398A10BDDA0739960A840F8104ZC13961CBA10BDDA079650
511BF9003EBDDA03DE3CBDD9FF200BA60EB4F78120Z703BDF986399634
511BF9180A640F81042611A60E260DA601850C2607961CB4EFBDDA076B
511BF930394FD60AC40FC1042C128608D60AC880D70AZA04C6CA200206
511BF948C69F2030EE33A60184B0F6007BC40F1BBDDA0B4F8C014427DA
511BF9600BC6F97D000A2B14C6AC20108608D60AC880D70AZA04C6CA04
511BF9782002C69FD7199A1CBA10BDDA0739960E850427076C2B2602BE
511BF9906C2739A62B26026A276A283900000000000000000000000030
511BF9A800000000000000000000000000000000000000000000000043
511BF9C000000000000000000000000000000000000000000000000002B
511BF9D80000000000000000000000000000000000000000000000013
511BF9F0000000000000000000000000000000000000000000000000FB
511BFA060000000000000000000000000000000000000000000000000E2
511BFA200000000000000000000000000000000000000000000000000CA
511BFA38000000000000000000000000000000000000000000000000B2
511BFA50000000000000000000000000000000000000000000000000009A
511BFA680000000000000000000000000000000000000000000000000082
511BFA800000000000000000000000000000000000000000000000006A
511BFA98000000000000000000000000000000000000000000000000052
511BFAB000000000000000000000000000000000000000000000000003A
511BFAC8000000000000000000000000000000000000000000000000022
511BFAE000000000000000000000000000000000000000000000000000A
511BFAF80000000000000000000000000000000000000000000000000F2
511BFB1000000000000000000000000000000000000000000000000D9
511BFB28000000000000000000000000000000000000000000000000C1
511BFB400000000000000000000000000000000000000000000000000A9
511BFB58000000000000000000000000000000000000000000000000091
511BFB70000000000000000000000000000000000000000000000000079
511BFB88000000000000000000000000000000000000000000000000061
511BFBA0000000000000000000000000000000000000000000000000049
511BFBB80000000000000000000000000000000000000000000000000031
511BFBD0000000000000000000000000000000000000000000000000019
511BFBE80000000000000000000000000000000000000000000000000001
511BFC000000000000000000000000000000000000000000000000000E8
511BFC180000000000000000000000000000000000000000000000000D0
511BFC300000000000000000000000000000000000000000000000000B8
511BFC4800000000000000000000000000000000000000000000000000A0
511BFC60000000000000000000000000000000000000000000000000088
511BFC78000000000000000000000000000000000000000000000000070
511BFC90000000000000000000000000000000000000000000000000058
511BFCA80000000000000000000000000000000000000000000000000040
511BFCC0000000000000000000000000000000000000000000000000028
511BFCD80000000000000000000000000000000000000000000000000010
511BFCF0000000000000000000000000000000000000000000000000000F8
511BFD060000000000000000000000000000000000000000000000000DF
511BFD200000000000000000000000000000000000000000000000000C7
511BFD380000000000000000000000000000000000000000000000000AF
511BFD500000000000000000000000000000000000000000000000000097
511BFD680000000000000000000000000000000000000000000000007F
511BFD80000000000000000000000000000000000000000000000000067
511BFD980000000000000000000000000000000000000000000000000004F
```

```
S11BFDB0000000000000000000000000000000000000000000000037
S11BFDC800000000000000000000000000000000000000000000001F
S11BFDE00000000000000000000000000000000000000000000000007
S11BFDF8000000000000000000000000000000000000000000000EF
S11BFE100000000000000000000000000000000000000000000000D6
S11BFE2800000000000000000000000000000000000000000000BE
S11BFE4000000000000000000000000000000000000000000000A6
S11BFE580000000000000000000000000000000000000000000008E
S11BFE70000000000000000000000000000000000000000000076
S11BFE6800000000000000000000000000000000000000000005E
S11BFEA00000000000000000000000000000000000000000000046
S11BFEB800000000000000000000000000000000000000000002E
S11BFED000000000000000000000000000000000000000000016
S11BFED000000000000000000000000000000000000000000000FE
S11BFEE800000000000000000000000000000000000000000000E5
S11BFF000000000000000000000000000000000000000000000CD
S11BFF180000000000000000000000000000000000000000000B5
S11BFF30000000000000000000000000000000000000000000009D
S11BFF480000000000000000000000000000000000000000000085
S11BFF6000000000000000000000000000000000000000000000D
S11BFF78000000000000000000000000000000000000000000060
S11BFF900000000000000000000000000000000000000000000055
S11BFFA800000000000000000000000000000000000000000003D
S11BFFC00000000000000000000000000000000000000000000025
S11BFFD8000000000000000000000000000000000000000000000D
S113FFF000000000000000D9EAD93ED93ED93EF5
S903D80024
```

I claim:

1. Improved Loran C signal processing apparatus having envelope cycle discrepancy compensation including an accumulator for each of a plurality of predetermined sample points wherein a sample is taken and accumulated on envelope derived Loran C pulses at each of the sample points and wherein the accumulators are scanned in a fine settle mode to determine a leading accumulator (L) and a trailing accumulator (T), the improvement comprising:
   means for calculating a measure M of envelope cycle discrepancy;
   means for generating an ECD reference E;
   means for comparing the reference E to the measure M calculated for the most recent fine settle determination to produce a control signal if the difference is greater than a predetermined threshold.

2. The improved Loran C signal processing apparatus of claim 1 wherein the reference E is an average value of ECD determined over a predetermined period of time.

3. The improved Loran C signal processing apparatus of claim 1 further comprising means for rejecting the fine settle determination and reinitiating the fine settle mode in response to generation of the control signal.

4. A method for compensating for envelope cycle discrepancy (ECD) in a Loran C receiver including accumulators for summing samples taken at predetermined sample points on envelope derived Loran C pulses and wherein a fine settle determination is made by determining a leading (L) and trailing (T) accumulator to locate a pulse tracking reference, the method comprising the steps of:
   (a) calculating a measure M of ECD after each fine settle determination;
   (b) generating an ECD reference, E;
   (c) comparing the reference E to the measure M and generating a control signal if the difference between E and M is greater than a predetermined threshold.

5. The method of claim 4 wherein the step of generating a reference E comprises generating a reference which is an average ECD value determined over a predetermined period of time.

6. The method of claim 4 further comprising the step of rejecting the fine settle determination and performing a new fine settle determination in response to generation of a control signal.

7. Improved Loran C signal processing apparatus having envelope cycle discrepancy compensation including an accumulator for each of a plurality of predetermined sample points wherein a sample is taken and accumulated on envelope derived Loran C pulses at each of the sample points and wherein the accumulators are scanned in a fine settle mode to determine a leading accumulator (L) and a trailing accumulator (T), the improvement comprising:
   means for calculating a measure of envelope cycle discrepancy, $M=(L+T)/(L-T)$;
   means for generating an ECD reference E;
   means for comparing the reference E to the measure M calculated for the most recent fine settle determination to produce a control signal if the difference is greater than a predetermined threshold.

8. Improved Loran C signal processing apparatus having envelope cycle discrepancy compensation including an accumulator for each of a plurality of predetermined sample points wherein a sample is taken and accumulated on envelope derived Loran C pulses at each of the sample points and wherein the accumulators are scanned in a fine settle mode to determine a leading accumulator (L) and a trailing accumulator (T), the improvement comprising:
   means for calculating a measure M of envelope cycle discrepancy;
   means for accumulating leading samples (L1) and trailing samples (T1) after the fine settle determination from samples of envelope derived Loran C pulses taken over a predetermined number of Loran C pulses groups, and means for generating an ECD reference $E=(L1+T1)/(L1-T1)$;

means for comparing the reference E to the measure M calculated for the most recent fine settle determination to produce a control signal if the difference is greater than a predetermined threshold.

9. A method for compensating for envelope cycle discrepancy (ECD) in a Loran C receiver including accumulators for summing samples taken at predetermined sample points on envelope derived Loran C pulses and wherein a fine settle determination is made by determining a leading (L) and trailing (T) accumulator to locate a pulse tracking reference, the method comprising the steps of:

(a) calculating a measure of ECD after each fine settle determination, $M=(L+T)/(L-T)$ (b) generating an ECD reference, E;

(c) comparing the reference E to the measure M and generating a control signal if the difference between E and M is greater than a predetermined threshold.

10. A method for compensating for envelope cycle discrepancy (ECD) in a Loran C receiver including accumulators for summing samples taken at predetermined sample points on envelope derived Loran C pulses and wherein a fine settle determination is made by determining a leading (L) and trailing (T) accumulator to locate a pulse tracking reference, the method comprising the steps of:

(a) calculating a measure M of ECD after each fine settle determination;

(b) accumulating leading sample sum (L1) and a trailing sample sum (T1) after the fine settle determination over a predetermined number of Loran C pulse groups; and, generating a reference $E=(L1+T1)/(L1-T1)$;

(c) comparing the reference E to the measure M and generating a control signal if the difference between E and M is greater than a predetermined threshold.

* * * * *